(12) United States Patent
Nakayasu et al.

(10) Patent No.: US 7,413,217 B2
(45) Date of Patent: Aug. 19, 2008

(54) GAS GENERATOR

(75) Inventors: Masayuki Nakayasu, Tatsuno (JP); Naoki Matsuda, Tatsuno (JP)

(73) Assignee: Daicel Chemical Industries, Ltd., Sakai-Shi (JP)

( * ) Notice: Subject to any disclaimer, the term of this patent is extended or adjusted under 35 U.S.C. 154(b) by 31 days.

(21) Appl. No.: 11/411,132

(22) Filed: Apr. 26, 2006

(65) Prior Publication Data

US 2006/0255577 A1 Nov. 16, 2006

Related U.S. Application Data

(60) Provisional application No. 60/689,574, filed on Jun. 13, 2005.

(30) Foreign Application Priority Data

Apr. 27, 2005 (JP) .............................. 2005-129868

(51) Int. Cl.
*B60R 21/26* (2006.01)
(52) U.S. Cl. ..................................................... 280/737
(58) Field of Classification Search ................ 280/736, 280/737, 740, 741; 102/530, 531
See application file for complete search history.

(56) References Cited

U.S. PATENT DOCUMENTS

| 5,536,040 | A | | 7/1996 | Cuevas et al. |
| 5,577,769 | A | * | 11/1996 | Di Giacomo et al. ........ 280/736 |
| 5,690,357 | A | * | 11/1997 | Cuevas ........................ 280/737 |
| 5,763,817 | A | * | 6/1998 | Renfroe et al. .............. 102/326 |
| 5,884,938 | A | * | 3/1999 | Rink et al. ................... 280/741 |
| 5,887,893 | A | | 3/1999 | Lang et al. |
| 6,098,548 | A | * | 8/2000 | Rink et al. ................... 102/531 |
| 6,233,908 | B1 | * | 5/2001 | Rink et al. ..................... 53/440 |

* cited by examiner

*Primary Examiner*—Christopher Ellis
*Assistant Examiner*—Robert A. Coker
(74) *Attorney, Agent, or Firm*—Birch, Stewart, Kolasch & Birch, LLP

(57) ABSTRACT

A gas generator, includes, a cylindrical housing including a seamless peripheral wall extending in an axial direction thereof between a first end and a second end, and including a gas discharge port; a first protruding portion provided in the peripheral wall of the cylindrical housing between the first end and the second end, such that the first protruding portion projects inwardly into an interior of the cylindrical housing; a first rupturable member attached to the first protruding portion such that the interior of the cylindrical housing is divided axially into a pressurized gas accommodating space in the first end from an ignition device accommodating space in the second end; a pressurized gas charged in the pressurized gas accommodating space; and an ignition device provided within the ignition device accommodating space.

14 Claims, 3 Drawing Sheets

GAS GENERATOR

This nonprovisional application claims priority under 35 U.S.C. § 119(a) on Patent Application No. 2005-129868 filed in Japan on 27 Apr. 2005 and 35 U.S.C. § 119(e) on U.S. Provisional Application No. 60/689,574 filed on 13 Jun. 2005, which are incorporated by reference.

BACKGROUND OF THE INVENTION

1. Field of the Invention

The present invention relates to a gas generator used in a human restraining apparatus for an automobile.

2. Description of the Related Art

There are types of gas generators that use pressurized gas as an air bag inflating medium, that use only a solid gas generating agent (gas generated upon combustion of the gas generating agent), and that use both. In all types, however, demands have been made for a simplified assembly process through a reduction in the number of components and simplification of the assembly operation itself.

In a gas generator having a plurality of components, there are many advantages to reduce the number of components as much as possible, to enable simplification of the assembly process and suppress manufacturing costs. In particular, when partitions are used in the housing interior to form a plurality of spaces, separate members are used to fix the partitions into position and so on, leading to extra work to process these separate members.

In prior art U.S. Pat. No. 5,536,040, an outer shell housing is formed by combining a first tube 220 storing a pressurized gas and a second tube 224 storing an ignition initiator 342. Both tubes are formed with opening portions each having an inward-facing flange, and a rupturable plate (closure member 266) is sandwiched between the flange portions.

Meanwhile, in prior art U.S. Pat. No. 5,887,893, an outer shell housing is formed by joining together a first section 90 storing an igniter and a second section 92 storing a pressurized gas. An inward-facing flange is formed on the second section 92, and opening means 70 are disposed in a central portion thereof.

SUMMARY OF THE INVENTION

An aspect of the present invention is directed to a gas generator for a human restraining apparatus of a vehicle, and the gas generator has: a cylindrical housing which is axially seamless from one end portion to another end portion, is provided with a sealed gas discharge port, and is charged with a pressurized gas in an interior thereof; an ignition device disposed in the interior of the cylindrical housing; a gas generating agent which is ignited and burned by the ignition device; a protruding portion, which faces radially inward, being formed in an inner wall surface of the cylindrical housing in any position between the two axial end portions of the cylindrical housing; a first rupturable member which is attached to the protruding portion such that the housing is divided axially into two spaces, separating a pressurized gas accommodating space accommodating the pressurized gas from an ignition device accommodating space accommodating the ignition device and the gas generating agent; and the gas discharge port being formed in the pressurized gas accommodating space.

Further, one aspect of the present invention is to provide a gas generator for a human restraining apparatus of a vehicle, the gas generator has: a cylindrical housing which is axially seamless from one end portion to another end portion, has one sealed end and an opening in the other end side, and is charged with a pressurized gas in an interior thereof; an ignition device disposed in the interior of the cylindrical housing; a protruding portion, which faces radially inward, being formed in an inner wall surface of the cylindrical housing in any position between the two axial end portions of the cylindrical housing; a first rupturable member which is attached to the protruding portion such that the housing is divided axially into two spaces, separating a pressurized gas accommodating space accommodating the pressurized gas from an ignition device accommodating space accommodating the ignition device, and a gas discharge port being formed in the ignition device accommodating space.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION OF THE INVENTION

Figure 1:
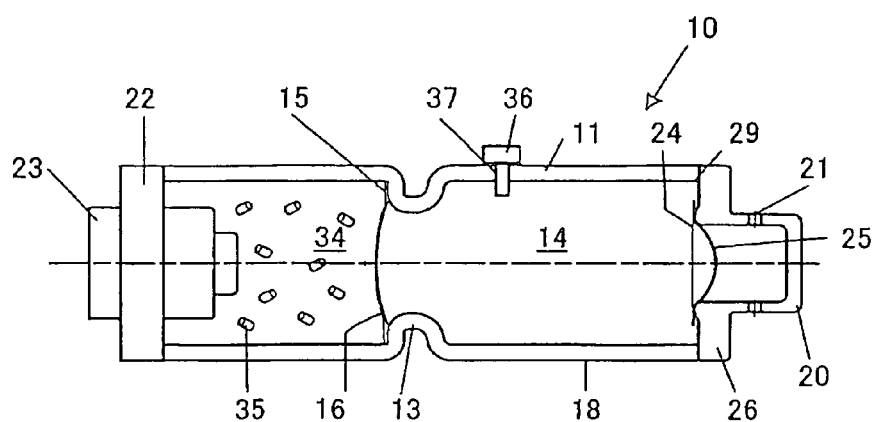
FIG. 1 shows a sectional view of a hybrid gas generator according to one embodiment of the present invention.

The present invention relates to a gas generator for a human restraining apparatus of a vehicle having a simplified assembly process and a simplified structure.

The present invention is a gas generator for a human restraining apparatus of a vehicle, and relates to a gas generator used in a restraining apparatus for protecting a passenger riding in the interior of the vehicle from a collision, or a gas generator used in a restraining apparatus for protecting a pedestrian who collides with the vehicle.

The present invention is a hybrid gas generator using both a solid gas generating agent and pressurized gas, in which heat, combustion gas, and so on generated upon combustion of the gas generating agent cause the first rupturable member to rupture such that the ignition device accommodating space communicates with the pressurized gas accommodating space. As a result, the pressure in the pressurized gas accommodating space rises, causing the sealed gas discharge port to open.

Nitrogen gas, an inert gas such as argon, helium, or neon, and so on may be used singly or in combination as the pressurized gas which is charged into the pressurized gas accommodating space. A solid gas generating agent which generates at least one of high-temperature gas and heat upon combustion is charged into the ignition device accommodating space, and the two spaces are separated by the first rupturable member. Hence, the pressurized gas accommodating space and ignition device accommodating space are adjacent to each other in the axial direction of the cylindrical housing via the first rupturable member and do not communicate with each other prior to activation of the gas generator.

In this gas generator, the first rupturable member is supported by and fixed to the protruding portion formed in the cylindrical housing. The protruding portion is formed by reducing the inner diameter of the cylindrical housing, and is preferably formed integrally with the cylindrical housing. Accordingly, the protruding portion is preferably formed by deforming the peripheral wall portion of the cylindrical housing a pressing method or the like such that the peripheral wall portion is caused to protrude radially inward. In so doing, the protrusion can be formed easily through pressing or the like, and hence the assembly process is simplified. Furthermore, the form of the component itself can be simplified, and hence the structure of the gas generator can also be simplified.

The protruding portion may take any form which can support the first rupturable member fixedly, and instead of a continuous protrusion (annular protruding portion) in the circumferential direction, two or more independent, non-continuous protrusions may be formed. However, to ensure contact with the first rupturable member and tight sealing of the pressurized gas, a continuous annular protrusion is preferable. Note that when the protruding portion is formed in a non-continuous form, an annular portion is formed in the peripheral edge of the first rupturable member to suppress gas leakage through the gaps between the protruding portion and the first rupturable member. The peripheral edge portion of the first rupturable member is then fixed by welding to the side face of the protruding portion and the annular portion is fixed by welding to the inner peripheral surface of the cylindrical housing.

By means of the first rupturable member, the space (pressurized gas accommodating space) in which the pressurized gas is charged and the ignition device accommodating space accommodating the ignition device and gas generating agent are formed as independent, non-communicating spaces prior to activation of the gas generator. By forming the ignition device accommodating space and the pressurized gas accommodating space from the common seamless cylindrical housing, a gas generator with a reduced number of components and a simplified structure can be obtained. In other words, the members forming the pressurized gas accommodating space and the ignition device accommodating space are formed by the common cylindrical housing, the protruding portion is formed in the boundary part between the two accommodating spaces, and the two accommodating spaces are partitioned by the first rupturable member.

The gas discharge port is formed on the pressurized gas accommodating space side. In other words, the gas discharge port is formed on the opposite side of the cylindrical housing to the ignition device accommodating chamber, and hence gas, including the combustion gas from the solid gas generating agent, flows in a one-way direction. Further, an electric igniter is generally used as the ignition device, and therefore a lead wire for transmitting an ignition current to the electric igniter is disposed on the opposite side to the gas discharge port. Thus the lead wire does not interfere with the human restraining apparatus (an air bag, for example) attached to the gas discharge port, making attachment of the human restraining apparatus easy. Note that the gas discharge port is closed prior to activation of the gas generator.

In the gas generator of the present invention, the gas discharge port is preferably formed in the opposite side end portion of the cylindrical housing to the ignition device accommodating space, and is formed by causing a peripheral wall portion of the cylindrical housing to protrude radially inward. The gas discharge port is preferably sealed by a second rupturable member.

In other words, the gas discharge port side of the cylindrical housing is also caused to protrude inward and the second rupturable member is attached to this protruding part, similarly to the fixing method for the first rupturable member. The protrusion for attaching the second rupturable member may be formed by pressing a part of the cylindrical housing (i.e. the housing end portion on the side at which the gas discharge port is formed, or the vicinity thereof) as described above to form an inward protrusion in annular form (either continuous or non-continuous), or by bending the open end portion on the gas discharge port side of the cylindrical housing inward such that the open end portion is formed with an inward-facing flange. The second rupturable member is then attached to the protrusion or the flange portion. In so doing, the second rupturable member can be fixed easily, and hence both the assembly process and the internal structure can be simplified.

Further, the gas generator of the present invention is a gas generator (pressurized gas type gas generator) using pressurized gas alone, wherein the first rupturable member, which seals the pressurized gas inside the cylindrical housing, is ruptured by the ignition device, as a result of which gas is generated. One end of the cylindrical housing may be sealed using a separate member, or may be fashioned from an open form into a sealed form using a Mannesman process or the like.

Nitrogen gas, an inert gas such as argon, helium, or neon, and so on may be used single or in combination as the pressurized gas which is charged into the pressurized gas accommodating space. An igniter which is ignited by an activation current is disposed in the ignition device accommodating space, and the two spaces are separated by the first rupturable member. Hence, the pressurized gas accommodating space and ignition device accommodating space are adjacent to each other in the axial direction of the cylindrical housing via the first rupturable member and do not communicate with each other prior to activation of the gas generator.

In this gas generator, the first rupturable member is supported by and fixed to the protruding portion formed in the cylindrical housing. The protruding portion is formed by reducing the inner diameter of the cylindrical housing, and is preferably formed integrally with the cylindrical housing. For example, the protruding portion is preferably formed by deforming the peripheral wall portion of the cylindrical housing a pressing method or the like such that the peripheral wall portion is caused to protrude radially inward. In so doing, the protrusion can be formed easily through pressing or the like, and hence the assembly process is simplified. Furthermore, the shape of the components themselves can be simplified, and hence the structure of the gas generator can also be simplified.

The protruding portion may take any form which can support the first rupturable member fixedly, and instead of a continuous protrusion (annular protruding portion) in the circumferential direction, two or more independent protrusions may be formed. However, to ensure contact with the first rupturable member and tight sealing of the pressurized gas, a continuous annular protrusion is preferable. Note that when the protruding portion is formed in a non-continuous form, an annular portion is formed in the peripheral edge of the first rupturable member to suppress gas leakage through the gaps between the protruding portion and the first rupturable member. The peripheral edge portion is then fixed by welding to the side face of the protruding portion and the annular portion is fixed by welding to the inner peripheral surface of the cylindrical housing.

By means of the first rupturable member, the space (pressurized gas accommodating space) in which the pressurized gas is charged and the ignition device accommodating space accommodating the ignition device are formed as independent, non-communicating spaces prior to activation of the gas generator. By forming the ignition device accommodating space and the pressurized gas accommodating space from the common seamless cylindrical housing, a gas generator with a reduced number of components and a simplified structure can be obtained. In other words, the members forming the pressurized gas accommodating space and the ignition device accommodating space are formed by the common cylindrical housing, the protruding portion is formed in the boundary part between the two accommodating spaces, and the two accommodating spaces are partitioned by the first rupturable member.

The igniter has an activation portion containing an ignition charge, and by providing the activation portion so as to face the first rupturable member, the shock wave, pressure, heat, and so on generated by the igniter can be caused to act directly on the first rupturable member. Alternatively, these products may be caused to act indirectly to break the first rupturable member. Here, the term "indirectly" indicates that a projectile or the like is driven by the products (shock wave, pressure, heat, and so on) of the igniter to impinge on, and thereby break, the first rupturable member.

In the gas generator of the invention described above, the protruding portion is preferably formed continuously in the circumferential direction of the cylindrical housing.

The protruding portion may be formed by causing any axial part of the housing between the two end portions to protrude inward such that the part is reduced in inner diameter, using a method such as pressing. Alternatively, a part having a non-continuous inner diameter may be formed. To form the part having a non-continuous inner diameter, a part of the housing in the axial direction between the two end portions is formed to protrude inward or expand outward using a pressing method or the like. The first rupturable member is then attached either directly or indirectly to the part having the reduced inner diameter.

Further, the protrusion is formed continuously in the circumferential direction, and hence gaps are unlikely to form between the first rupturable member and the housing (or the protruding portion). As a result, the pressurized gas accommodating space can be sealed reliably.

Further, in the gas generator of the present invention, the protruding portion is preferably formed by causing an axial part of the peripheral wall portion of the cylindrical housing to protrude radially inward in a ring form.

Since only a part of the housing is processed, the housing can be formed easily.

Further, in the gas generator of the present invention, the first rupturable member is preferably attached directly to the protruding portion by resistance welding.

To fix the first rupturable member to the protruding portion, a method may be used in which the first rupturable member is fixed by welding to a ring-shaped annular member, whereupon the annular member is attached to the protruding portion. However, if the first rupturable member is attached to the protruding portion directly, the annular member can be omitted, enabling simplification of the assembly process and a reduction in the number of components, and hence this method is preferable.

To fix the first rupturable member directly to the protruding portion, a well-known welding method (for example, resistance welding, laser welding, or the like) may be used.

The gas generator for a human restraining apparatus according to the present invention is provided with a structure for fixedly supporting a first rupturable member which separates the interior of a cylindrical housing into a plurality of spaces, and the rupturable member supporting/fixing structure can be formed by means of a simple formation method. As a result, the structure of the gas generator is simplified and the number of components is reduced. Therefore, assembly is easy and the assembly process itself can be simplified.

EMBODIMENTS OF THE INVENTION (1) First Embodiment

A gas generator of the present invention will now be described with reference to FIG. 1. FIG. 1 is an axial sectional view of a hybrid gas generator 10.

A diffuser portion 20 having a plurality of gas outlets 21 is fixed by welding to an opening portion at one end of a seamless cylindrical housing 11 having two open ends. A closure 22 attached with an igniter 23 is fixed by welding to the opening portion at the other end. The closure 22 also serves as a collar for fixing the igniter 23.

A protruding portion 13 is formed in a peripheral wall portion 18 of the cylindrical housing 11 by deforming the peripheral wall portion 18 inward at an axially intermediate part between the two end portions. The protruding portion 13 is formed by reducing the diameter of the peripheral wall portion 18 continuously in the circumferential direction, using a method of pressing the peripheral wall portion 18 of the cylindrical housing 11 to deform the peripheral wall portion 18 from the outside toward the inside, for example. A first rupturable plate 16 is fixed by welding to a side face 15 of the protruding portion 13 so as to contact the side face 15. Here, the side face 15 of the protruding portion 13 and the first rupturable plate 16 are welded such that no gaps are formed therebetween. Resistance welding may be used as the welding method. As a result, the interior of the cylindrical housing 11 is separated into two spaces (a combustion chamber 34 and a pressurized gas chamber 14).

When the protruding portion 13 is formed in the cylindrical housing 11, the two endparts of the housing are open, and hence the first rupturable plate 16 may be attached to the side face of the protruding portion 13 from either the combustion chamber 34 side or the pressurized gas chamber 14 side. In FIG. 1, the first rupturable plate 16 is attached to the combustion chamber 34 side.

A plurality of granular gas generating agents 35 are charged into the combustion chamber. The gas generating agent is ignited and burned by combustion products (a flame, high-temperature gas, and so on) generated when the igniter 23 is activated. Upon combustion of the gas generating agent 35, a flame, high-temperature gas, and so on are generated.

For example, the gas generating agent used here may be formed by mixing a material containing a fuel and an oxidizer, or a fuel, an oxidizer and a slag forming agent, with a bonding agent appropriately, and then molding this mixture into a desired shape. When this type of gas generating agent is used, the gas generated upon combustion thereof can contribute to inflation of the air bag together with the pressurized gas. When a gas generating agent containing a slag forming agent is used, slag can be formed particularly easily, and hence the amount of mist-form combustion residue discharged from the gas generator can be greatly reduced. When using a gas generating agent, it is particularly preferable to employ a gas generating agent in which the melting point of the combustion residue generated upon combustion of the gas generating agent is equal to or higher than the discharge temperature of the gas generated by the gas generating agent. In so doing, the combustion residue is less likely to be discharged to the outside of the housing, which is preferable.

The fuel preferably contains at least one component selected from guanidine derivatives and the like such as nitroguanidine (NQ), guanidine nitrate (GN), guanidine carbonate, aminonitroguanidine, aminoguanidine nitrate, aminoguanidine carbonate, diaminoguanidine nitrate, diaminoguanidine carbonate, and triaminoguanidine nitrate. Alternatively, the fuel may contain at least one component selected from tetrazole, tetrazole derivatives, and so on.

The oxidizer preferably contains at least one component selected from strontium nitrate, potassium nitrate, ammonium nitrate, potassium perchlorate, copper oxide, iron oxide, basic copper nitrate, and so on.

The slag forming agent preferably contains at least one component selected from acid clay, talc, bentonite, diatomaceous earth, kaolin, silica, alumina, sodium silicate, silicon nitride, silicon carbide, hydrotalcite, and a mixture thereof.

The bonding agent preferably contains at least one component selected from sodium carboxymethyl cellulose, hydroxyethyl cellulose, starch, polyvinyl alcohol, guar gum, microcrystalline cellulose, polyacrylamide, calcium stearate, and so on.

As a specific compositional example, the gas generating agent may contain 20 to 60% by mass of nitroguanidine as a fuel and 80 to 40% by mass of an oxidizer. More preferably, the gas generating agent may contain 30 to 40% by mass of nitroguanidine as a fuel, and 70 to 60% by mass of strontium nitrate as an oxidizer. In addition, the fuel and oxidizer may be blended with a bonding agent (sodium carboxymethyl cellulose or the like) and a slag forming agent (acid clay or the like), and in this case the composition of the gas generating agent is preferably 20 to 60% by mass of the fuel, 40 to 65% by mass of the oxidizer, 3 to 12% (preferably 4 to 12%) by mass of the bonding agent, and 1 to 20% (preferably 3 to 7%) by mass of the slag forming agent.

The diffuser 20 takes a cup form and provided with gas outlets 21 formed at equal intervals in a peripheral wall portion. A second rupturable plate 25 is attached to an opening portion 24 of the diffuser 20. Also, a flange 26 extends outward from the opening portion 24. The opposite end portion of the cylindrical housing 11 (on the right side of FIG. 1) is open, and therefore the flange 26 is fixed by a method such as welding to this opening portion 29 in order to seal the opening portion 29. Pressurized gas is charged into the space (pressurized gas chamber) 14 that is sealed by the first rupturable plate 16 and second rupturable plate 25.

The pressurized gas includes an inert gas (in the present invention, nitrogen is also assumed to be an inert gas) such as argon or helium. The charging pressure of the pressurized gas is preferably between 10,000 and 80,000 kPa, and more preferably between 30,000 and 60,000 kPa.

Note that in FIG. 1, reference numeral 37 denotes a charging hole for charging gas into the pressurized gas chamber 14, and reference numeral 36 denotes a sealing pin for sealing the charging hole 37 after the gas has been charged. The gas is charged after the diffuser 20 attached with the second rupturable plate 25 and the first rupturable plate 16 have both been attached.

Next, an operation of the gas generator 10 shown in FIG. 1 when incorporated into an air bag system of an automobile will be described briefly.

When the automobile collides, the igniter 23 is activated, and as a result, the gas generating agent 35 in the combustion chamber 34 is ignited and burned, thereby generating high-temperature gas. The high-temperature gas raises the internal pressure of the combustion chamber 34, and when the internal pressure reaches or exceeds a predetermined pressure, the first rupturable plate 16 ruptures. The combustion gas, together with the pressurized gas charged into the space 14, raises the internal pressure of the space 14 and the combustion chamber 34. until the second rupturable plate 25 ruptures. The pressurized gas and the combustion gas from the gas generating agent 35 are then ejected through the gas outlets 21 to inflate the air bag.

(2) Second Embodiment

Figure 2:
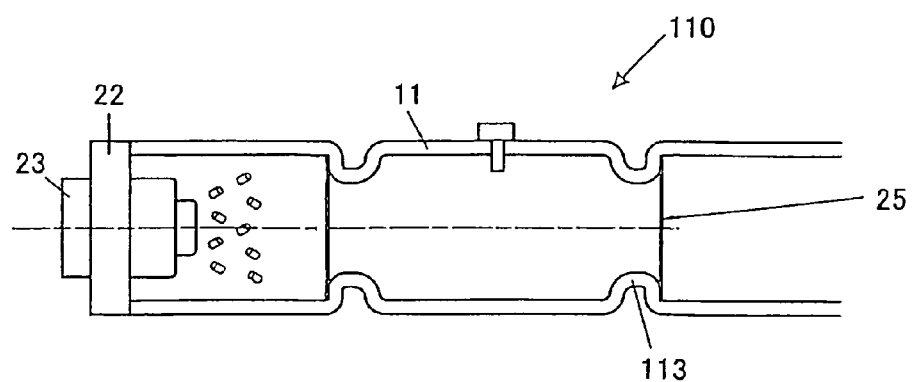
FIG. 2 shows a sectional view of a hybrid gas generator according to another embodiment of the present invention.

Another embodiment of the present invention will now be described with reference to FIG. 2. The gas generator shown in FIG. 2 is basically identical to the gas generator of FIG. 1, but the part corresponding to the diffuser 20 of FIG. 1 is different. Accordingly, description of structures which are shared with FIG. 1 has been omitted, and only this different part will be described.

A gas generator 110 of FIG. 2 employs the seamless cylindrical housing 11 having two open ends, which is similar to the housing 11 in FIG. 1. One end portion of the cylindrical housing 11 is sealed by attaching the closure 22 attached with the igniter 23 thereto, while the opposite end portion (on the right side of FIG. 2) remains open. A second protruding portion 113, which is identical to the protruding portion 13 formed for holding the first rupturable plate 16 in the embodiment shown in FIG. 1, is formed slightly to the inside of the open end portion, and a second rupturable plate 25 is attached to a side face of the second protruding portion 113. The second rupturable plate 25 is inserted into the housing through the open end at the opposite end portion of the cylindrical housing 11 (on the right side of FIG. 2, i.e., the opposite side to the igniter 23) and fixed to the second protruding portion 113. With the end portion of the cylindrical housing 11 on the second rupturable plate 25 side open, the generated gas flows in the axial direction of the housing. Note that, in this embodiment, the diffuser 20 of FIG. 1 may be attached to the opposite end portion in a similar manner to that shown in FIG. 1.

(3) Third Embodiment

A third embodiment will now be described with reference to FIG. 3. A gas generator 210 of FIG. 3 differs structurally from the gas generator 10 of FIG. 1 on the periphery of the diffuser 20 and the periphery of the first rupturable plate 16, but is otherwise structurally identical. Identical parts have been allocated identical reference numerals to those used in FIG. 1, and description thereof has been omitted. Only parts that are different to those in FIG. 1 will be described.

Figure 3:
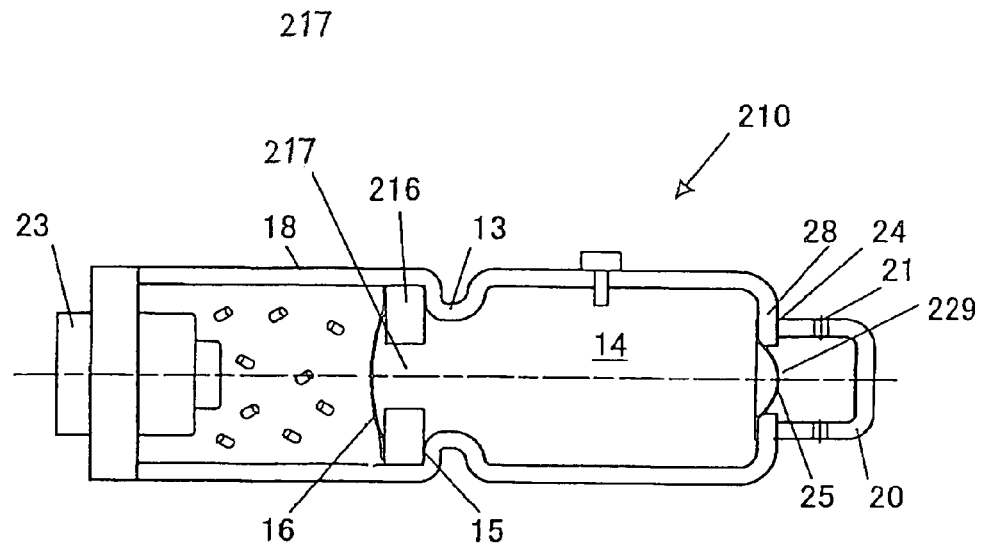
FIG. 3 shows a sectional view of a hybrid gas generator according to a further embodiment of the present invention.

In the gas generator 210 of FIG. 3, the first rupturable plate 16 is fixed indirectly to the protruding portion 13 formed in the peripheral wall portion 18. More specifically, the first rupturable plate 16 is first attached by welding or the like to a ring-shaped holding member 216, where upon the holding member 216 is fixed by welding or the like to the side face 15 of the protruding portion 13. Similarly to FIG. 1, to attach the holding member 216, the holding member 216 attached with the first rupturable plate 16 is inserted into the cylindrical housing 11 through the opening portion at one end side (on the left side of FIG. 3, i.e., the igniter 23 side), then brought into contact with the side face 15 of the protruding portion 13 and welded and fixed thereto. Particularly when the combustion performance of the gas generating agent is affected by pressure, the opening area of a central hole 217 in the holding member 216 may be adjusted.

Note that the first rupturable plate 16 and holding member 216 may be formed integrally.

Meanwhile, the opposite end portion of the cylindrical housing 11 (on the right side of FIG. 3, i.e., the opposite side to the igniter 23) differs structurally from FIG. 1 in that an inward-facing flange 28 is formed and a gas discharge port 229 is formed thereby. The gas discharge port 229 is sealed by the second rupturable plate 25, which is attached to the opposite end portion of the cylindrical housing 11 from the inside.

The diffuser 20 is also attached to the opposite end portion. Similarly to FIG. 1, the diffuser 20 takes a cup form having the gas outlets 21 formed at equal intervals in the peripheral wall portion. The diffuser 20 is fixed to the inward-facing flange 28 at the opening portion 24 thereof by welding or the like. Pressurized gas is charged into the space (pressurized gas chamber) 14 sealed by the first rupturable plate 16 and second rupturable plate 25.

(4) Fourth Embodiment

A further embodiment of the present invention will now be described with reference to FIG. 4. A gas generator 310 of FIG. 4 differs from the gas generator of FIG. 1 in the shape of the protruding portion for supporting and fixing the first rupturable plate, and the manner in which the igniter 23 (or the collar 22) is fixed to the housing 11.

Figure 4:
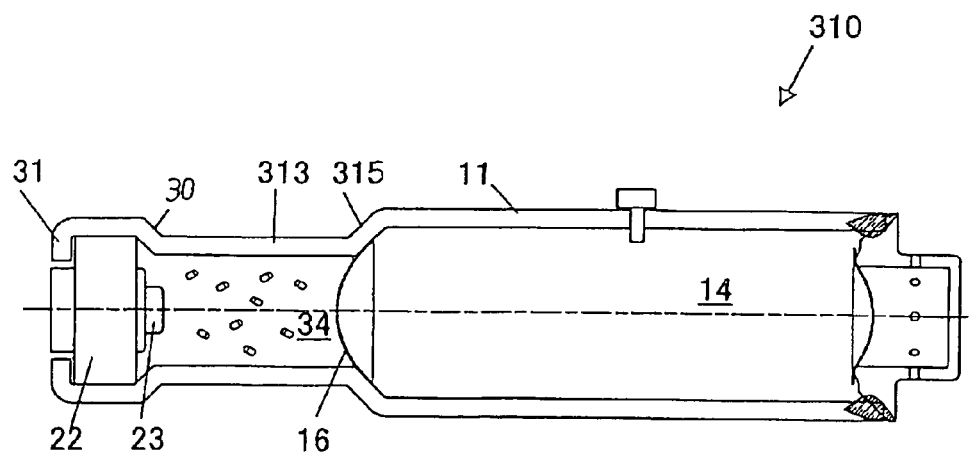
FIG. 4 shows a sectional view of a hybrid gas generator according to a further embodiment of the present invention.

In FIG. 1, the diameter of the housing is basically constant except for the protruding portion 13, but in the structure shown in FIG. 4, the housing diameter (inner diameter) at the part forming the ignition device accommodating space 34 is smaller than the housing diameter at the part forming the pressurized medium accommodating space 14. As a result, a reduced diameter portion 313 is formed, and the first rupturable plate 16 is fixed by welding to a side face portion 315 thereof. The reduced diameter portion 313 may be formed by pressing the part of the cylindrical housing corresponding to the ignition device accommodating space 34 to reduce the diameter thereof, or by enlarging the diameter of the part corresponding to the pressurized medium accommodating space 14.

Note that the first rupturable plate 16 may be fixed to a holding member, whereupon the holding member is welded to the reduced diameter portion 313, similarly to the embodiment shown in FIG. 3. Further, the holding member may be formed integrally with the first rupturable plate and then fixed by welding to the reduced diameter portion 313.

To fix the igniter 23, a stepped portion 30 is formed and the peripheral edge of the collar 22 is brought into contact therewith. The igniter collar 22 can then be fitted into the open end portion of the cylindrical housing (on the left side of the drawing) and fixed by caulking an end portion 31.

(5) Fifth Embodiment

Figure 5:
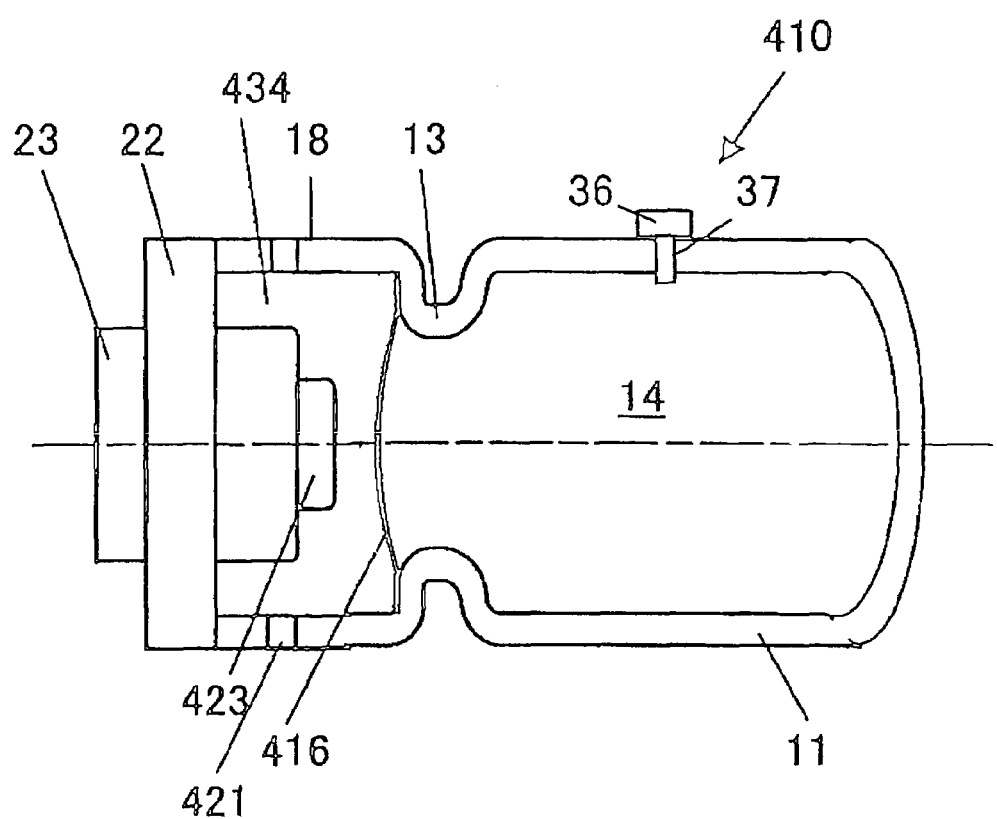
FIG. 5 shows a sectional view of a pressurized gas type gas generator according to one embodiment of the present invention.

A further embodiment of the present invention will now be described with reference to FIG. 5. A gas generator 410 shown in FIG. 5 differs from the gas generators shown in FIGS. 1 to 4 in that only pressurized gas is used. FIG. 5 is a sectional view of the gas generator 410.

The cylindrical housing of the gas generator 410 takes a cylindrical form having both end portions open. One end (on the right side of FIG. 5) is deformed by a Mannesmann process or the like and thereby sealed. Alternatively, a separate disk-shaped sealing member may be fixed to the open end by welding or the like to seal the open end.

The opposite end portion of the cylindrical housing 11 (on the left side of FIG. 5) is open, and the protruding portion 13 is formed continuously in the circumferential direction in a slightly offset position from the axial center of the cylindrical housing 11 between the two end portions. Similarly to the gas generator 10 of FIG. 1, the protruding portion 13 is formed by reducing the diameter of the peripheral wall portion 18 continuously in the circumferential direction, using a method of pressing the peripheral wall portion 18 of the cylindrical housing 11 to deform the peripheral wall portion 18. A rupturable plate 416 is fixed by welding to a side face of the protruding portion 13 so as to contact the side face. Here, the side face of the protruding portion 13 and the rupturable plate are welded such that no gaps are formed therebetween. As a result, the pressurized gas chamber 14 is formed in the interior of the cylindrical housing 11.

Meanwhile, the igniter 23 fixed to the igniter collar 22 is attached to the opposite end portion of the cylindrical housing 11 (on the left side of FIG. 5). The igniter is disposed such that an activation portion 423 storing an ignition charge faces the rupturable plate 416. By attaching the igniter 23, an ignition device accommodating chamber 434 is formed in the opposite end portion of the cylindrical housing 11 (on the left side of FIG. 5). In contrast to the gas generators of FIGS. 1 to 4, no gas generating agent exists in the ignition device accommodating chamber 434.

Gas discharge ports 421 are formed in a part of the peripheral wall portion 18 of the cylindrical housing 11 corresponding to the ignition device accommodating chamber 434. The gas discharge ports 421 are formed at equal intervals in the peripheral wall portion 18.

When assembling the gas generator 410 of FIG. 5, one end portion of the cylindrical housing 11 (on the right side of FIG. 5) is closed by the processing method described above or a separate member, whereupon the protruding portion 13 is formed in the peripheral wall portion 18 by a pressing method. The rupturable plate 416 is then inserted through the open end portion at the opposite end of the cylindrical housing (on the left side of FIG. 5), and fixed by welding to the side face of the protruding portion 13. Pressurized gas is then charged through the gas charging hole 37 to a predetermined pressure, whereupon the gas charging hole 37 is sealed by the sealing pin 36. In this state, the collar 22 attached with the igniter 23 is fixed to the opposite end portion of the cylindrical housing 11 (on the left side of FIG. 5).

Next, an operation of the gas generator 410 shown in FIG. 5 when incorporated into an air bag system of an automobile will be described briefly.

When the automobile collides, the igniter 23 is activated, and as a result, combustion products (high-temperature gas, a shock wave, a flame, and so on) are generated from the activation portion 423. These combustion products act on the rupturable plate 416 such that the rupturable plate 416 ruptures. The pressurized gas stored in the pressurized gas chamber 14 then flows into the ignition device accommodating chamber 434 and then flows out through the gas discharge ports 421 into the connected air bag.

According to the gas generator of the present invention, the first rupturable plate (16 in FIGS. 1 to 4), the second rupturable plate (25 in FIGS. 2 to 4), and the rupturable plate (416 in FIG. 5) can be fixed easily. Moreover, the shape of the component used to fix the rupturable plates is simplified, thereby facilitating processing of this component.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a human restraining apparatus of a vehicle, comprising:
a cylindrical housing which is axially seamless from one end portion to another end portion, is provided with a sealed gas discharge port, and is charged with a pressurized gas in an interior thereof, a part of an outer peripheral portion of the cylindrical housing having a reduced diameter portion such that a part of an inner peripheral portion of the cylindrical housing forms a protruding portion that protrudes into the interior of the cylindrical housing, the protruding portion being formed in any position between two axial end portions of the cylindrical housing;
an ignition device disposed in the interior of the cylindrical housing;
a gas generating agent which is ignited and burned by the ignition device;
a first rupturable member, which is attached to the protruding portion such that the housing is divided axially into a pressurized gas accommodating space accommodating the pressurized gas and an ignition device accommodating space accommodating the ignition device and the gas generating agent; and
the gas discharge port being formed in the pressurized gas accommodating space.

2. The gas generator according to claim 1, wherein the gas discharge port is formed in the opposite side end portion of the cylindrical housing to the ignition device accommodating space, is formed by causing a peripheral wall portion of the cylindrical housing to protrude radially inward, and is sealed by a second rupturable member.

3. The gas generator according to claim 1, wherein the protruding portion is formed continuously in a circumferential direction of the cylindrical housing.

4. The gas generator according to claim 1, wherein the protruding portion is formed by causing an axial part of the peripheral wall portion of the cylindrical housing to protrude radially inward in a ring form.

5. The gas generator according to claim 1, wherein the first rupturable member is attached directly to the protruding portion by resistance welding.

6. A gas generator, comprising:
a cylindrical housing including a seamless peripheral wall extending in an axial direction thereof between a first end and a second end, and including a gas discharge port, a part of an outer peripheral portion of the cylindrical housing having a reduced diameter portion such that a part of an inner peripheral portion of the cylindrical housing forms a first protruding portion that protrudes into an interior of the cylindrical housing;
a first rupturable member attached to the first protruding portion such that the interior of the cylindrical housing is divided axially into a pressurized gas accommodating space in the first end from an ignition device accommodating space in the second end;
a pressurized gas charged in the pressurized gas accommodating space; and
an ignition device provided within the ignition device accommodating space.

7. A gas generator according to claim 6, further comprising:
a gas generating agent provided within the ignition device accommodating space,
wherein the gas discharge port is formed so as to connect the pressurized gas accommodating space and an exterior of the cylindrical housing, and closed by a second rupturable member.

8. A gas generator according to claim 7, wherein the second end is provided with a second protruding portion projecting inwardly into the interior of the cylindrical housing and the second rupturable member is attached to the second protruding portion.

9. A gas generator according to claim 6, wherein the cylindrical housing is closed at the first end and the gas discharge port is formed so as to connect the ignition device accommodating space to an exterior of the cylindrical housing.

10. A gas generator according to claim 6, wherein the first protruding portion is formed continuously in a circumferential direction of the cylindrical housing.

11. A gas generator according to claim 10, wherein the first rupturable member is attached to a side face of the first protruding portion.

12. A gas generator, comprising:
a cylindrical housing including a seamless peripheral wall extending from a first end to a second end thereof, and being provided with a gas discharge port at the second end, the cylindrical housing having,
a first circumferential portion having a first outer diameter,
a second circumferential portion having a second outer diameter smaller than the first diameter and being provided between the first end and the second end, such that outer diameters of the first end and the second end are larger than the second outer diameter, the second circumferential portion including a reduced inner diameter smaller than an inner diameter of the first circumferential portion, and
a side face portion provided between the first circumferential portion and the second circumferential portion, the side face portion being stepped to be inclined and connecting the first circumferential portion and the second circumferential portion at a side of the second end with respect to the second circumferential portion;
a rupturable member provided within the cylindrical housing, such that a circumferential edge of the rupturable member is attached to the side face portion and an interior of the cylindrical housing being divided into a first space and a second space; and
an ignition device provided within the first space.

13. A gas generator according to claim 12, further comprising:
a stepped portion provided at a side of the first end with respect to the second circumferential portion and being inclined and connecting to the second circumferential portion,
wherein the ignition device is provided, such that the ignition device is attached to the stepped portion.

14. A gas generator according to claim 13, further comprising;
a gas generating agent provided within the first space; and
a pressurized gas charged in the second space,
wherein the gas discharge portion is closed.

* * * * *